United States Patent Office 2,856,818
Patented Oct. 21, 1958

2,856,818

PROTECTIVE MIRROR COATING

Paul T. Woodberry, Columbus, Ohio, assignor, by mesne assignments, to Ohio Plate Glass Company, Toledo, Ohio, a corporation of Ohio No Drawing. Application July 27, 1954
Serial No. 446,143

10 Claims. (Cl. 88—105)

This invention relates to a protective coating system for mirrors. More particularly, this invention relates to a new varnish composition for protectively coating mirrors and to the protectively coated mirrors.

The increasing interest for using silver mirrors, particularly flat glass mirrors, in outdoor exposure conditions, places stringent requirements on backing materials to protect the quality of the reflective film. It is well known to those skilled in the art of protecting mirrors that the thin metallic reflective film itself possesses very poor resistance to deterioration as a result of exposure under the conditions of its normal domestic and industrial use. In order to retain the initially good reflecting quality and color of the reflecting film on the glass, it is required that a protective material be used upon the back surface of the metallic film. Many different combinations of backing material have been described in the art, each being directed toward prolonging the appearance and reflectivity of the mirror.

It is generally held that mirror failure is essentially corrosion of the reflective film due to the action of water vapor and atmospheric gases. A majority of mirror protective coatings available protect by excluding moisture and atmospheric gases from contact with the reflective film. However, a portion of the reflective film may become exposed to the atmosphere if such coatings contain an occasional pore or crack through the coating, or if the coating is accidentally scratched. The exposed surface is a point for corrosive attack which will cause progressive deterioration of the reflective film. Thus, it is highly desirable that a coating system should have the additional characteristic of inhibiting the corrosive attack on the reflective film in the event the reflective film is accidentally exposed to the atmosphere by an occasional crack or scratch in the protective coating. These protective qualities should be combined with a certain physical behavior in a good mirror backing, such that the backing breaks sharply with the glass, without chipping or without peeling the reflective film when the glass is cut. Likewise, when mirror edges are finished and polished, the protective coating should wear away readily and should not cause the reflective film to pull away from the edge. Another desirable feature in a commercial backing is that it be sufficiently hard and tough to resist scratching or marring during assembling, handling, and mounting.

Under normal conditions of use, the known mirror backings or coatings do afford a degree of protection from deterioration of the reflective film. None of these coatings were found to have all of the desirable properties mentioned above combined with consistent protection for prolonged periods of time against the effects of chemical attack or corrosion by water vapor and atmospheric gases. Hence, it would be highly desirable not only to provide a tough, moisture-impervious, non-corrosive, and adherent mirror backing, but also to provide such a backing at an economical cost. The coating material, once prepared, should be stable on storage and easily applied.

It is, therefore, an object of this invention to provide a new varnish composition for protectively coating the metallic surfaces of mirrors.

Further, it is an object of this invention to provide a varnish for protectively coating mirrors, the resulting coating being characterized by adherence and by protecting the reflecting film from breaking, flaking, peeling, scratching, oxidation, moisture penetration, and other deterioration over a relatively long period of time, the varnish being further characterized by stability during prolonged storage.

Still further, it is an object of this invention to provide a new varnish composition which will protect the reflective metallic surface of a mirror by mechanical resistance to shocks that induce cracking of the varnish film, and by inhibiting corrosion of the metallic reflective film.

Still further, it is an object of this invention to provide a new article of manufacture comprising a light-permeable material, a metallic reflective surface, and a varnish for protectively coating said reflective surface.

In addition, it is an object of this invention to provide a new protective-backing system of organic coatings, including the new varnish composition.

These and other objects and advantages of the present invention will become more apparent from the following detailed description and example.

The protective coating of the present invention is a varnish-type composition which fulfills the objectives set forth immediately above. Essentially, the new varnish comprises the embodiment of a high percentage by weight of lead oxide (at least 10%) in a drying oil, together with a synthetic resin, whereby the highly leaded oil is retained in solution or as a homogeneous mixture.

In the preparation of this varnish, a synthetic rosin-phenol aldehyde modified maleic alkyd resin was formulated from the following materials:

| Material | Mole | Weight, grams |
|---|---|---|
| Rosin | 0.32 | 97 |
| Pentaerythritol | 0.32 | 43.5 |
| Paraldehyde | 0.16 | 21.0 |
| Phenol | 0.16 | 15.0 |
| Maleic anhydride | 0.16 | 15.6 |

The rosin and paraldehyde were heated within 20 minutes to 234° F. in a flask provided with a stirrer, condenser, and thermometer. At 15-minute intervals, the pentaerythritol, maleic anhydride, and phenol were added in that order during the next half hour, while the mixture was continually stirred and gradually raised to 440° F. over a 3-hour period. At that time, refluxing had ceased and the mixture was held at 440° F. for an additional 20 minutes with the condenser removed. The resin was poured on a flat surface to cool.

A drying oil-lead oxide reaction product was prepared by boiling 20 grams of linseed oil and 12 grams of tung oil with 16 grams of lead oxide and 0.8 gram of manganese dioxide for two hours at 390° F. A "short oil"-type varnish was prepared by the addition of 40 grams of the previously prepared maleic alkyd resins. The mixture was heated and stirred for one-half hour. This product was cooled and then powdered. This powder was used to make a 40% solution in commercial solvent, such as xylene.

This new varnish is a stable solution that does not gel on standing. It has a rapid drying time, being tack free in ten minutes and hard enough to handle within one-half hour. Although this varnish produces a hard film, it is not excessively brittle.

This varnish was applied as a one-coat system to mirrors, and gave 12 to 24 days' protection under conditions of high humidity. The high-humidity tests used in these experiments were carried out at 100% relative humidity at 125° F. These accelerated tests show that the varnish film would provide adequate protection for silver films during normal use. The varnish film neither cracked nor crazed.

This highly leaded drying oil alkyd resin varnish was also used in a two-coat system wherein the alkyd resin varnish was used as a primer coat over copper-plated silver mirrors. Two types of organic top coatings were used. One type was a water emulsion-polyvinyl acetate paint. The other top coat was a cold-setting catalyzed epoxide resin paint. Mirrors with the polyvinyl acetate top coating over the alkyd resin varnish and also the mirrors with the epoxide resin paint top coating over the alkyd resin varnish gave complete protection for a minimum period of 30 days in the high-humidity test. The mirrors having the polyvinyl acetate top coat gave protection of from 2 to 4 days in salt spray. The salt-spray test used in these experiments was carried out at 95° F. with a salt fog made from a 20% NaCl solution. The epoxide resin paint top coat gave excellent protection of from 4 to 10 days in salt spray. This latter two-coat system should be the system used for mirrors which are subjected to severe conditions, such as the marine atmosphere abroad ship.

Observation of the mirror coated with the primer coat and the top coat of the epoxide resin paint during the high-humidity tests indicated the continued protection of the reflective surface, even though the protective coating began to peel away from the edges of the mirror. In this case, the top coat of the epoxide resin paint began to peel off during the later stages of the high-humidity test and with it pulled away portions of the primer coat, thereby exposing the reflective surface. Although the mirror continued to be subjected to the high-humidity test for approximately fifteen days, the exposed reflective surface showed no signs of corrosion or deterioration. Inspection of the mirror suggested that the highly leaded drying oil present in the primer coating somehow provided an inhibitory protection against subsequent corrosive influences.

Several commercially available mirror-backing compositions were tested for purposes of comparison with the highly leaded drying oil alkyd resin varnish composition of this invention. In no case did any of the commercially available backing compositions provide protection beyond about 6 days in the high-humidity test. Three of these commercial backing compositions gave protection of only three days in high humidity. One of these mirror-backing compositions was tested in salt fog and failed within one day. Analysis of one of the commercial mirror-backing compositions showed a one-half of one percent lead content in the dried film. This amount of lead is that which is commonly present in the varnish as a dryer. In comparison, it is seen that the varnish composition of the present invention provides highly superior protection.

In addition, various experiments with other varnishes containing a high lead content were tried. Thus, highly leaded rosin was prepared and dissolved in varnish solvents. Also, shellac varnishes were prepared using highly leaded drying oils. These varnishes were not stable on storage, were undesirably brittle, and were slow drying. However, experiments with these varnishes also indicated, as in the varnish composition of this invention, that the high lead content had some inhibitory effect on the corrosion of metal surfaces of mirrors.

Alkyd resins have been utilized before in varnishes which contain either little or no leaded drying oil. This invention comprises a combination of alkyd resin and an unusually highly leaded drying oil resulting in unexpected stability on storage when dissolved in a varnish solvent. In addition, corrosion protection and unexpected desirable physical properties are offered by the new combination as a mirror coating.

It is obvious that the apparent inhibitory action of the lead organic compounds would be of little commercial value, unless existing in a varnish composition having the desired physical properties. These objectives of combining inhibitory protection with physical protection are realized in the type of varnish compositions set forth in the following claims and the above disclosure. This varnish composition not only provides a hard, impermeable, abrasion-resistant film, but also is not excessively brittle. Thus, a protective film is obtained which, in addition, permits glass mirrors to be cut without breaking or peeling the protective and reflective films from the glass base.

The new, heavily leaded varnish will protect a mirror at cut edges or near scratched and marred areas which expose silver to the atmosphere, suggesting that the presence of the lead organic reaction products affords an inhibitory action towards the corrosion of the metal, even though the coating no longer excludes the atmosphere from the metal. The varnish must contain at least 10 percent by weight lead oxide in the vehicle to effectively offer this inhibitory action. Further, the synthetic alkyd resin must be incorporated in the varnish composition to result in all the other additional desirable properties cited which are not usually characteristic of a heavily leaded drying oil.

Other compounds in the making of the alkyd resin varnish would occur to one skilled in the art of paint and varnish manufacture. Thus, suitable rosin modified alkyd resins could be produced by a polyhydric alcohol other than pentaerythritol, other dicarboxylic acids than maleic anhydride, and other phenolic aldehyde reactants which produce varnish-adaptable alkyd resins. The particular ingredients specified are the best known at present for the purposes set forth.

What is claimed is:

1. The process of protectively coating the metallic back surfaces of mirrors consisting of applying on said metallic surface a varnish-type coating comprising an organic solvent and the heat-reaction product of a rosin-phenol aldehyde modified alkyd resin and a highly leaded drying oil, the lead content of the resultant reaction product being at least 10 percent by weight, calculated as lead oxide.

2. The process of claim 1 wherein the modified alkyd resin is a modified maleic alkyd resin.

3. The process of claim 1 wherein the drying oil is a mixture of linseed oil and tung oil.

4. The method of protectively coating copper-plated silver mirrors comprising applying on said copper plate a varnish-type coating comprising an organic solvent and the reaction product of a rosin-phenol aldehyde modified alkyd resin and a highly leaded drying oil, the lead content of the resultant reaction product being at least 10 percent by weight, calculated as lead oxide.

5. A mirror structure comprising a light-permeable base, a metallic reflective film on one side of said light-permeable base, and a varnish coating on said metallic reflective film comprising the reaction product of a rosin-phenol aldehyde modified alkyd resin and a highly leaded drying oil, the lead content of the resultant reaction product being at least 10 percent by weight, calculated as lead oxide.

6. A protective varnish coating for the exposed back metallic surfaces of mirrors comprising the reaction product of a rosin-phenol aldehyde modified alkyd resin and a highly leaded drying oil, the lead content of the resultant reaction product being at least 10 percent by weight, calculated as lead oxide.

7. The process of protectively coating the metallic back surfaces of mirrors comprising applying on said metallic surfaces, a varnish-type coating comprising an organic solvent and the reaction product of (a) a resin condensate consisting of rosin, a phenol, an aldehyde, a polyhydric alcohol, and a polybasic acid and (b) a highly leaded drying oil, the lead content of the resultant reaction product being at least 10 percent by weight, calculated as lead oxide.

8. The process of claim 7 wherein the polyhydric alcohol is pentaerythritol and the polybasic acid is maleic acid.

9. The process of claim 7 wherein the drying oil is a mixture of linseed oil and tung oil.

10. A protective varnish for the exposed back metallic surfaces of mirrors comprising an organic solvent and the reaction product of (a) a resin condensate consisting of rosin, a phenol, an aldehyde, a polyhydric alcohol and a polybasic acid and (b) a highly leaded drying oil, the lead content of the resultant reaction product being at least 10 percent by weight, calculated as lead oxide.

References Cited in the file of this patent

UNITED STATES PATENTS

| | | |
|---|---|---|
| 2,081,153 | Rosenblum | May 25, 1937 |
| 2,101,182 | Kittredge et al. | Dec. 7, 1937 |
| 2,103,538 | Kolb | Dec. 28, 1937 |
| 2,142,833 | Benton et al. | Jan. 3, 1939 |
| 2,595,800 | McGraw et al. | May 6, 1952 |
| 2,699,402 | Meyer | Jan. 11, 1955 |

FOREIGN PATENTS

| | | |
|---|---|---|
| 437,894 | Great Britain | Nov. 7, 1935 |